United States Patent [19]

Arav

[11] Patent Number: 4,583,567

[45] Date of Patent: * Apr. 22, 1986

[54] VALVES

[75] Inventor: Ronnie A. Arav, Bolton, England

[73] Assignee: Beloit Corporation, Beloit, Wis.

[*] Notice: The portion of the term of this patent subsequent to Jul. 23, 2002 has been disclaimed.

[21] Appl. No.: 545,778

[22] Filed: Oct. 27, 1983

[30] Foreign Application Priority Data

Oct. 30, 1982 [GB] United Kingdom ............... 8230927

[51] Int. Cl.⁴ .......................................... G05D 16/18
[52] U.S. Cl. ..................................... 137/115; 137/87; 251/50
[58] Field of Search ................. 137/87, 100, 114, 115; 60/426; 91/512, 515, 517

[56] References Cited

U.S. PATENT DOCUMENTS

| | | | |
|---|---|---|---|
| 2,313,991 | 3/1943 | Fitch | 137/87 X |
| 2,489,823 | 11/1949 | Senninger | 137/87 X |
| 3,154,925 | 11/1964 | DeVita | 60/426 |
| 3,216,441 | 11/1965 | Thorsheim | 137/87 |

Primary Examiner—Robert G. Nilson

Attorney, Agent, or Firm—Dirk J. Veneman; Gerald A. Mathews; Raymond W. Campbell

[57] ABSTRACT

A valve is proposed for regulating and balancing the pressure in two fluid pressure systems. The valve comprises a balance piston and a regulating piston. The balance piston is acted on by the pressures in each of the two systems and the regulating piston is acted on by a regulating pressure and by the pressure in one of the systems. The balance and regulating pistons each control a respective connection to a relief line for each of the two systems. Thus, the regulating pressure determines the pressure in one system, while the balance piston determines the pressure in the other system relative to the pressure regulated by the regulating piston. The regulating pressure may be either pneumatic or hydraulic pressure. Shock absorber means is provided to resist movement of the balance piston in response to rapid pressure fluctuations. The shock absorber means comprises a plunger and a bore adapted to receive the plunger. A passageway communicating with the blind bore has a control orifice for controlling the flow of fluid to and from the blind bore.

10 Claims, 2 Drawing Figures

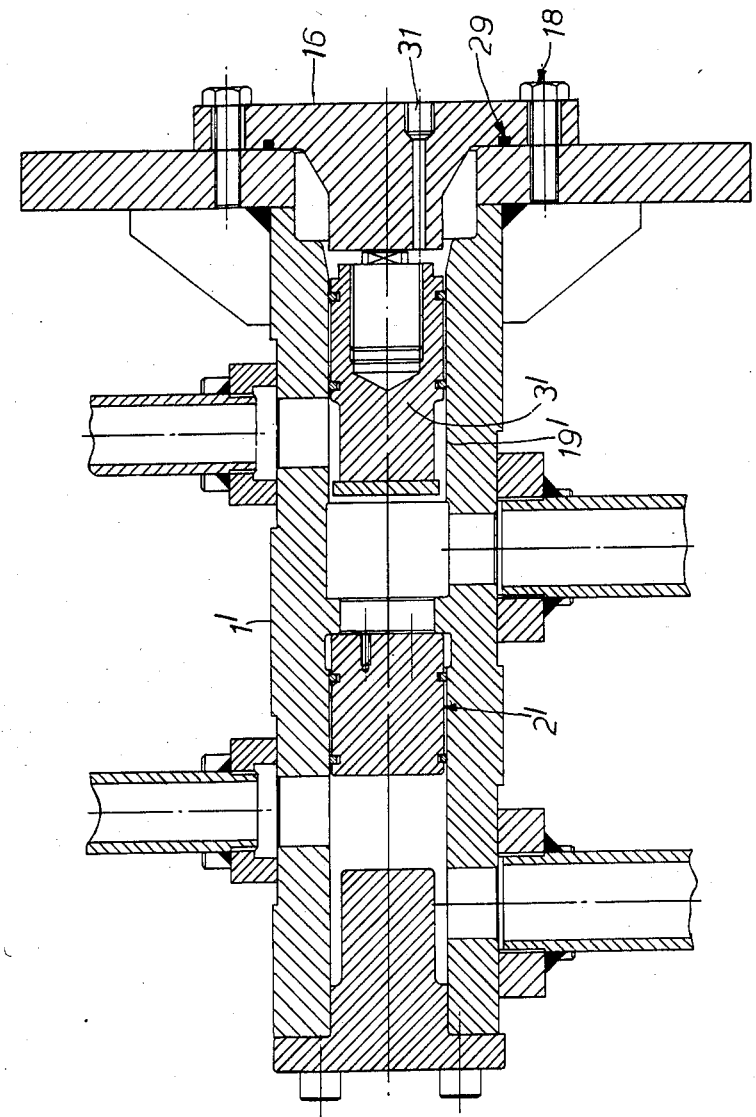

VALVES

The present invention relates to a valve for regulating and balancing the pressure in two separate fluid pressure systems.

It is an object of the invention to control and maintain the pressure in the two systems without mixing of the two fluids.

According to the present invention there is provided a valve for regulating and balancing the pressure in two fluid pressure systems, the valve comprising a valve body having a bore therein receiving a balance piston whose opposite ends are subjected to the fluid pressure in first and second fluid pressure systems, and which controls communication of the second pressure system with a relief line, a regulating piston received in a bore in the valve body and subjected at one end to fluid pressure in the first pressure system and acted on by a regulating pressure, said regulating piston controlling communication of the first pressure system with an associated relief line, the regulating piston serving to establish a regulated pressure in the first pressure system and the balance piston serving to balance the pressure in the second pressure system relative to that regulated in the first pressure system.

The balance piston carries two space apart annular seals which isolate the fluid of the two systems and thus prevent mixing thereof. The regulating piston is preferably acted on by a pneumatic pressure whereby the pressure in the two fluid systems is related in a fixed ratio to the controlled pneumatic pressure. The regulating piston is in the form of a stepped piston or two pistons operatively coupled together. Adjustment of the pneumatic pressure gives rise to a corresponding increase or decrease in the pressure in the second fluid pressure systems. The pressure in the first system relates to th pneumatic pressure in inverse proportion to their corresponding piston areas. Alternatively the regulating piston may be controlled by applying hydraulic pressure thereto.

The present invention will now be described, further by way of example only, with reference to the accompanying drawing, in which:

FIG. 2 is a sectional view of another embodiment of valve according to the invention.

Figure 1:
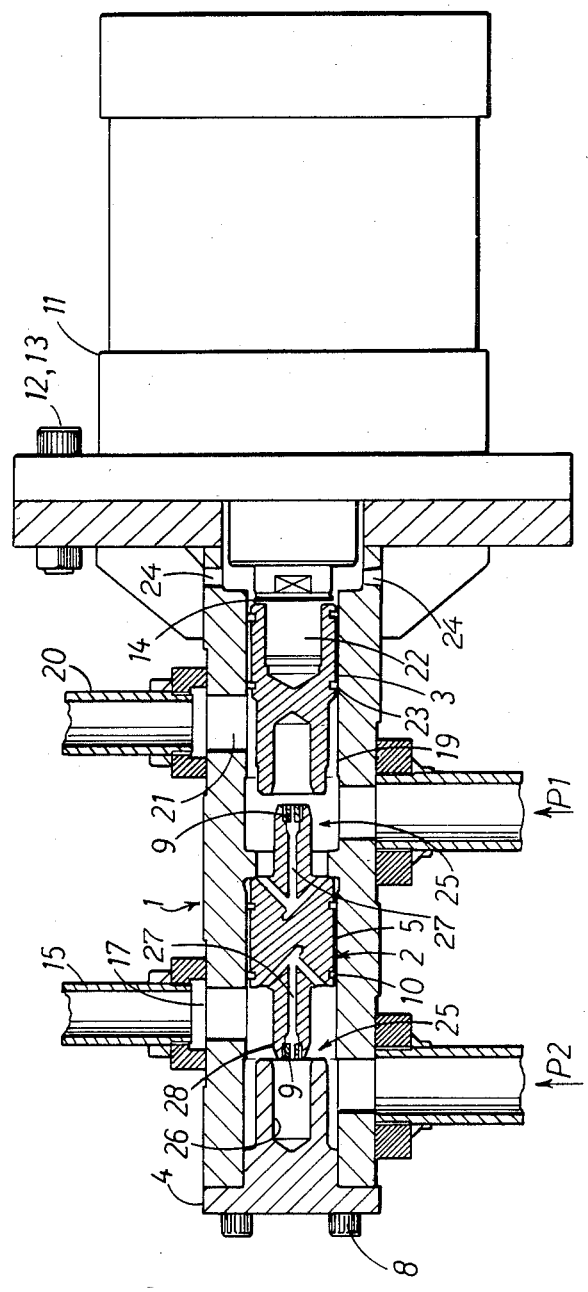
FIG. 1 illustrates, in partial section, a valve according to the invention.

A valve has a valve body 1 with a bore 5 accomodating a balance piston 2. The balance piston is subject at opposite ends to the fluid pressure P1 in a first fluid pressure system and a fluid pressure P2 in a second fluid pressure system. The balance piston 2 controls communication of the second pressure system with an associated relief line 15. The relief line leads to a reservoir which is at a lower pressure than P2 and which is preferably at atmospheric pressure. Two seals 10 carried by the piston 2 isolate the fluid of the first pressure system from the fluid of the second pressure system and thereby prevent mixing of the two fluids. The balance piston is illustrated in a stop position in which a port 17 in the bore 5 is fully open. The port 17 is preferably triangular in shape such that movement of the piston 5 to the right uncovers a progressively larger area of port for a given increment of travel.

A regulating piston 3 is received in a bore 19 in the valve body. The regulating piston 3 is subjected to the fluid pressure P1 in the first fluid pressure system and controls communication of the first fluid pressure system with an associated relief line 20. The relief line 20 communicates with the bore 19 by way of a port 21. The regulating piston 2 is acted on by pneumatic air pressure and in the illustrated embodiment a pneumatic cylinder 11 is secured to the valve body and a piston disposed in the cylinder cooperates with the regulating piston 3 by way of a push rod 22. A pin 14 connects the push rod and regulating piston. The regulating piston 3 carries two seals 23. A vent port 24 is disposed between the regulating piston port 3 and the piston of the pneumatic cylinder.

Movement of the balance piston is resisted in both directions by shock absorber means 25. For convenience only one of the shock absorbers is described fully. The bore of the valve body remote from the pneumatic cylinder 11 is closed by a blanking plate 4 which is secured in position by screws 8. The blanking plug has a blind bore 26 which is dimensioned to receive a plunger 28 carried by one end of the balance piston 2. A passageway 27 in the piston 2 connects the end of the plunger 26 to the second fluid pressure system. A sleeve 9 having a control orifice is disposed in the passageway 27. The size of the orifice may be varied in order to achieve the desired piston resistance. The shock absorber described resists movement of the balance piston in a direction to close the relief line 15. The other shock absorber resists movement of the balance piston in a direction to uncover the relief line 17. The plunger is formed on the balance piston and the blind bore is formed in the regulating piston 3. It will be appreciated that the respective plungers 26 could be formed in the plate 4 and regulating piston 3 and the blind bore could be formed in the balance piston. The throttle orifice could be formed in the plate 4 or the regulating piston.

In operation air pressure acting on the pneumatic cylinder piston displaces the regulating piston to the left to close the relief line 20. Fluid pressure P1 introduced in the first fluid pressure system acts on the regulating piston and is regulated to a pressure which is proportional to the ratio between the area of the regulating piston subjected to fluid pressure P1 and the area of the pneumatic piston subjected to a controlled air pressure. Thus, a change in the air pressure gives rise to a change in the fluid pressure P1.

The pressure P1 in the first fluid pressure system acts on the balance piston 2 to displace it to the left, whilst the pressure P2 in the second fluid pressure system displaces it to the right. When the pressures P1 and P2 are equal the piston 2 closes off the port 17 of the relief line 15. If the pressure P2 rises the balance valve is displaced to the right, as illustrated, uncovers the relief line and draining fluid to the reservoir until the pressures P1 and P2 are equalised. Fluid is supplied from respective pumps to the two systems at a pressure which ensures that the desired pressure can always be achieved in the two systems.

The shock absorbers 25 associated with the balance piston 2 restrict the movement of the balance piston and thus avoid oscillation or too rapid a response. The amount of restriction can be varied by changing the size of the orifice in the sleeve 9. Where no resistance is required the sleeve can be omitted.

The pneumatic air cylinder serves to damp oscillation of the regulating piston.

As an alternative to controlling the regulating piston 3 in the embodiment of FIG. 1 by a pneumatic cylinder, hydraulic pressure may be used. Such hydraulic operation is shown in the embodiment of FIG. 2 in which the regulating piston 3' is acted on by hydraulic pressure. An end plate 16 is secured by bolts 18 to a flange of the valve body 1' to close off the end of the bore 19' which is enlarged to form a chamber for hydraulic fluid. A seal ring 29 is provided to seal the chamber. The fluid enters the chamber by way of a line connection 31 and the pressure supplied thereto is controlled from a pressure source by way of a regulating valve. The embodiment of FIG. 2 also exhibits a modified construction of balance piston 2' in which the damping means has been dispensed with. Otherwise the valve is similar in its construction and operation to the embodiment of FIG. 1.

An application of the valve is in paper making where the two pressure circuits of the E.N.P. (Extend Nip Press) and C.C. Roll (Calender Roll) respectively have to be maintained at equal predetermined pressures. The regulator enables the pressure to be varied, whilst the balance piston equalises the pressure. The valve according to the invention avoids the two fluids from becoming mixed.

I claim:

1. A valve for regulating and balancing the pressure in two fluid pressure systems comprising a valve body, a bore in the valve body, a balance piston received in the bore, opposite ends of the balance piston being subjected to the fluid pressure in the first and second fluid pressure systems, a relief line for the second pressure circuit the communication with which is controlled by the balance piston, a regulating piston received in the valve body and the regulating piston being subjected at one end to fluid pressure in the first pressure system, and a regulating pressure which acts on the regulating piston in opposition to the pressure in the first pressure system, a relief line for the first pressure system being controlled by the regulating piston, the regulating piston serving to establish a regulated pressure in the first pressure system, and the balance piston serving to balance the pressure in the second pressure system relative to that regulated in the first pressure system.

2. A valve according to claim 1 wherein the regulating pressure is pneumatic pressure.

3. A valve according to claim 2 wherein the regulating piston is of stepped diameter.

4. A valve according to claim 2 wherein the regulating piston comprises two pistons of different areas operatively coupled together.

5. A valve according to claim 1 wherein the regulating pressure is a hydraulic pressure.

6. A valve according to claim 1 wherein shock absorber means is provided to resist movement of the balance piston in response to pressure fluctuations.

7. A valve according to claim 6 wherein the shock absorber means comprises a plunger, a blind bore adapted to receive the plunger, and a passageway having a control orifice for allowing controlled passage of fluid to and from the blind bore on displacement of the plunger therein.

8. A valve according to claim 7 wherein each end of the balance piston carries one of said plungers for cooperating engagement with a respective one of said blind bores in the regulating piston and a blanking plug fitted in the valve body.

9. A valve according to claim 1 wherein two axially spaced annular seals are provided on the balance piston to isolate the fluid in the two systems from one another.

10. A valve according to claim 1 wherein a triangular shaped port is controlled by the balance piston such that a progressively larger area of port for a given increment of travel is uncovered on displacement of the balance piston in a direction to open communication of the second pressure system with the relief line.

* * * * *